(12) United States Patent
Beck et al.

(10) Patent No.: US 7,729,387 B2
(45) Date of Patent: Jun. 1, 2010

(54) METHODS AND APPARATUS FOR CONTROLLING LATENCY VARIATION IN A PACKET TRANSFER NETWORK

(75) Inventors: Juergen Beck, Hohenkammer (DE); David P. Sonnier, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 543 days.

(21) Appl. No.: 11/669,559

(22) Filed: Jan. 31, 2007

(65) Prior Publication Data

US 2008/0181112 A1 Jul. 31, 2008

(51) Int. Cl.
*H04J 3/06* (2006.01)
(52) U.S. Cl. ..................................... 370/518
(58) Field of Classification Search .............. 370/395.4, 370/252, 422, 423, 424, 230, 230.1, 464, 370/498, 503, 516, 517, 518
See application file for complete search history.

(56) References Cited

U.S. PATENT DOCUMENTS 6,134,217 A * 10/2000 Stiliadis et al. ............. 370/232
6,157,653 A    12/2000 Kline et al.
6,259,677 B1   7/2001 Jain
6,876,952 B1 * 4/2005 Kappler et al. .............. 702/187
2003/0152094 A1 8/2003 Colavito et al.
2004/0114602 A1 * 6/2004 Ko et al. .................. 370/395.4

FOREIGN PATENT DOCUMENTS

WO   PCTUS2007062210      12/2007

* cited by examiner

*Primary Examiner*—Hanh Nguyen
*Assistant Examiner*—Obaidul Huq
(74) *Attorney, Agent, or Firm*—Ryan, Mason & Lewis, LLP

(57) ABSTRACT

Methods and apparatus for controlling latency variation of packets received in a packet transfer network are provided. A plurality of packets is received at a network element of a receive node of the packet transfer network. A time-stamp is provided for each of the plurality of packets. An egress delay time is computed at a scheduler of the network element for each of the plurality of packets in accordance with each corresponding time-stamp to provide a substantially constant latency for the plurality of packets upon egression from the network element.

22 Claims, 2 Drawing Sheets

METHODS AND APPARATUS FOR CONTROLLING LATENCY VARIATION IN A PACKET TRANSFER NETWORK

FIELD OF THE INVENTION

The present invention relates generally to packet and cell transfer networks and, more particularly, to techniques for controlling latency variation over packet and cell transfer networks.

BACKGROUND OF THE INVENTION

Various services in the Telecom network rely on a low latency variation transfer to ensure proper operation. Such services among others include synchronization and multimedia services (voice and video). Currently, with the prevalence of layer-3 and layer-2 packet networks, such as Internet and Ethernet, cost can be reduced by transmitting timing synchronization and voice service, as well as distributing video service between telecom equipment within the packet network. However, due to the store-and-forward operation of packet networks, those services will experience an uncertain delay, which will affect the accuracy of in-time delivery. This uncertainty in delay is commonly referred to as packet delay variation (PDV).

In addition to its effect on timing synchronization signals, PDV also has a significant effect on packets transferring voice and video data. It is desirable for packets transferring voice data to have a minimum, and above all, a well controlled, latency or delay, thus a substantial reduction or elimination of PDV is required. However, the amount of latency or delay does not carry a similar importance, since it is more important for the latency or delay to remain constant throughout the transfer. Therefore, it is desirable to at least significantly reduce or eliminate PDV for both timing synchronization signals and data packets in packet transfer networks.

Previous attempts to solve the problem of PDV and provide a predictable latency have included best effort forwarding in conjunction with traffic engineering as well as protocol specific manipulation of time-stamps. However, the traffic engineering of network nodes results in under-utilization of an expensive node.

Additional attempts have included work-conserving and non-work-conserving scheduling at an egress port upon reception of transferred packets. Work-conserving scheduling selects and schedules egression as soon as a previous egression is completed, while non-work-conserving scheduling selectively provides egression breaks for short, controlled periods of time. However, such scheduling methods have failed to involve real-time knowledge regarding the exact point in time when a packet would need to leave the device based on its arrival time. Thus, the scheduling methods fail to provide a jitter-bound behavior.

Regarding time-stamp-based packet synchronization methods, such as, for example, IEEE 1588, two techniques for providing timing synchronization with reduced PDV are known. These techniques include probabilistic filtering algorithms and long time averaging.

A probabilistic filtering algorithm filters out any large packet delays and uses the small packet delays for calculation of correction factors and timing synchronization of a local clock of a receive node with a transmit clock of a transmit node. This method usually has high complexity. The process of obtaining satisfactory small delays for calculation is random, therefore, successful performance of the probabilistic filtering algorithms in the short-term is not guaranteed.

Long time averaging provides a method that averages the delay of multiple transferred packets in order to eliminate the PDV. However, in an actual system, obtaining an absolute time is difficult because the local clock of the receive node is not accurate and requires synchronization. Any adjustment of the local clock may adversely affect the result of the delay averaging. Moreover, this method is not flexible, in that the result of the averaging cannot be controlled.

For a multitude of network services, such as, for example timing over packet (ToP) services, it is desirable to achieve a deterministic per-hop behavior that defines the policy and priority applied to a packet when traversing a hop. More specifically, the deterministic per-hop behavior may be considered a determination of a predictable latency at network elements, such as, for example, switches, routers or multiplexers, which may be particularly useful for timing synchronization over packet networks.

SUMMARY OF THE INVENTION

The present invention provides a method and apparatus for controlling latency variation of transferred packets in order to provide techniques for controlling latency variation at network elements of the packet transfer network.

In accordance with one aspect of the present invention, a method for controlling latency variation of packets received in a packet transfer network is provided. A plurality of packets is received at a network element of a receive node of the packet transfer network. A time-stamp is provided for each of the plurality of packets. An egress delay time is computed at a scheduler of the network element for each of the plurality of packets in accordance with each corresponding time-stamp to provide a substantially constant latency for the plurality of packets upon egression from the network element.

In an illustrative embodiment, each of the plurality of packets may be queued for egression from the network element, and each of the plurality of packets received at the network element may be classified in accordance with a nature of each of the plurality of packets. Each of the plurality of packets may be transmitted through an egress port in accordance with each corresponding egress delay time computed at the scheduler.

In accordance with another aspect of the present invention, a network element is provided in a receive node of a packet transfer network. The network element comprises a classifier that provides a time-stamp for each of a plurality of packets received by the network element. The network element further comprises a scheduler in communication with the classifier that computes an egress delay time for each of the plurality of packets in accordance with each corresponding time-stamp to provide a substantially constant latency for the plurality of packets upon egression from the network element.

In an illustrative embodiment the network element may further comprise a real-time clock in communication with the classifier for providing a time-stamp for each of the plurality of packets. The network element may also further comprise one or more queues in communication with the classifier and the scheduler that store one or more of the plurality of packets for egression from the network element. Additionally, the network element may comprise an ingress port that is in communication with the classifier, and that receives each of the plurality of packets, as well as an egress port that is in communication with the scheduler, and through which each of the plurality of packets are transmitted in accordance with each corresponding egress delay time computed at the scheduler.

In accordance with a further aspect of the present invention, an integrated circuit device is provided in a receive node for controlling latency variation of packets received in a packet transfer network. The integrated circuit device is configured to receive a plurality of packets, and provide a time-stamp for each of the plurality of packets. The integrated circuit device is further configured to compute an egress delay time for each of the plurality of packets in accordance with each corresponding time-stamp to provide a substantially constant latency for the plurality of packets upon egression.

These and other features and advantages of the present invention will become apparent from the following detailed description of illustrative embodiments thereof, which is to be read in connection with the accompanying drawings.

DETAILED DESCRIPTION

As will be described in detail below, the present invention in the illustrative embodiment relates generally to the field of packet transfer networks and, more particularly, to improved techniques for latency variation control of packets received in the packet transfer network. The illustrative embodiment of the present invention introduces a network element for use in the receive node having latency variation sensitivity.

Figure 1:
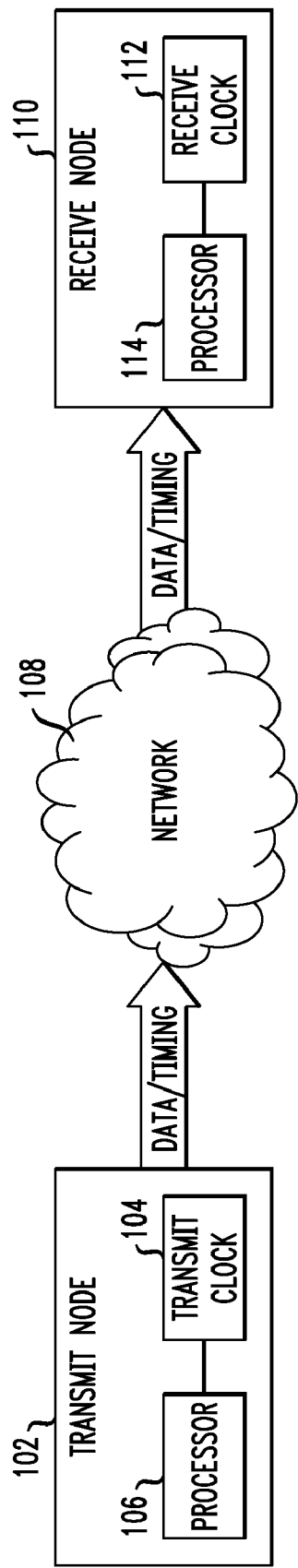
FIG. 1 is a diagram illustrating a packet transfer network, according to an embodiment of the present invention.

Referring initially to FIG. 1, a diagram illustrates a packet transfer system, according to an embodiment of the present invention. A transmit node 102 includes a transmit clock 104 in communication with a transmit node processor 106. Packets for transfer may be stored in a transfer queue of transmit node and may be time-stamped at transmit node 102 in accordance with transmit clock 104 and transmit node processor 106. The packets, which include data and possibly timing information, are transferred through a network 108 to a receive node 110. Receive node 110 includes a receive clock 112, in communication with a receive node processor 114. The packets are time-stamped again at receive node 110 in accordance with receive clock 112 and receive node processor 114. Time-stamps are provided at receive node 110 in accordance with the embodiments of the present invention which allow for proper scheduling and latency variation control of packets received in the packet transfer network.

Figure 2:
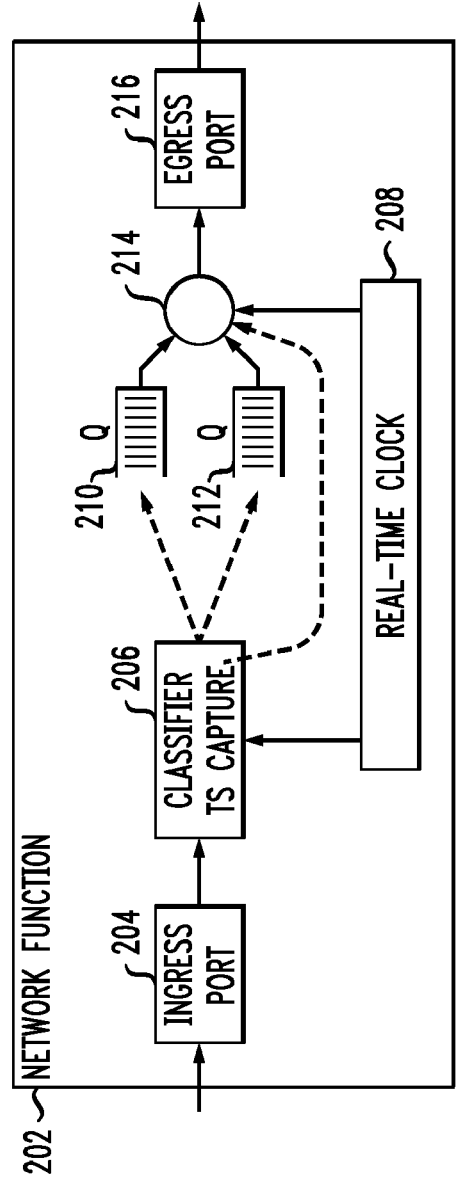
FIG. 2 is a diagram illustrating a network element at a receive node of the packet transfer network, according to an embodiment of the present invention.

Referring now to FIG. 2, a diagram illustrates a network element for use in a receive node of a packet transfer network, according to an embodiment of the present invention. Transferred packets are received at a network element 202 through an ingress port 204. Network element 202 may be embodied as, for example, a switch, a router, or a multiplexer. Packets are transmitted to a classifier 206, where each packet is time-stamped in accordance with a real-time clock 208. Real-time clock 208 may be in communication with a clock external to network element 202 and may include a phase-locked loop. Classifier 206 may also have the capability to classify the nature of each packet to determine its service eligibility. For example, classifier 206 may classify a packet as containing timing information, voice data or video data. Such a classification may directly affect the delay correction required for the packet and the resulting scheduling of the packet for egression from network element 202.

Time-stamped packets are sent to queues 210, 212. The embodiment of the present invention shown in FIG. 2 illustrates two such queues; however any number of queues may be utilized within network element 202 for proper scheduling of packet egression. A scheduler 214 is in communication with classifier 206 and real-time clock 208. Scheduler 214 is also in communication with queues 210, 212 and an egress port 216. Scheduler 214 drives egress port 216 for each packet leaving queues 210, 212 to provide a constant regular interval between packet ingression and packet egression and thereby eliminating latency variability or PDV.

More specifically, scheduler 214 utilizes time-stamps of the received packets to determine an extra delay that must be provided in order for the delay variation to be removed. Scheduler 214 computes a constant regular interval I, where $I = (TS_0 - TS_i) + dT + T_0$. $T_0$ is the maximum intrinsic delay, which is provided at set up. $TS_0$ is the time-stamp of the time when the scheduler was executed previously. The exact time of the last execution may not be available from the packet. Instead $TS_0$ may be stored in a location that is accessible to the scheduler. $TS_i$ is the time-stamp of the current packet. In order to yield dT, the equation is resolved as $dT = I - (TS_0 - TS_i) - T_0$. Scheduler 214 then drives egress port 216 for a given packet after a delay of $S_i = dT + T_0$. This provides a constant delay or latency for the transferred packets exiting egress port 216 regardless of packet transfer congestion.

Figure 3:
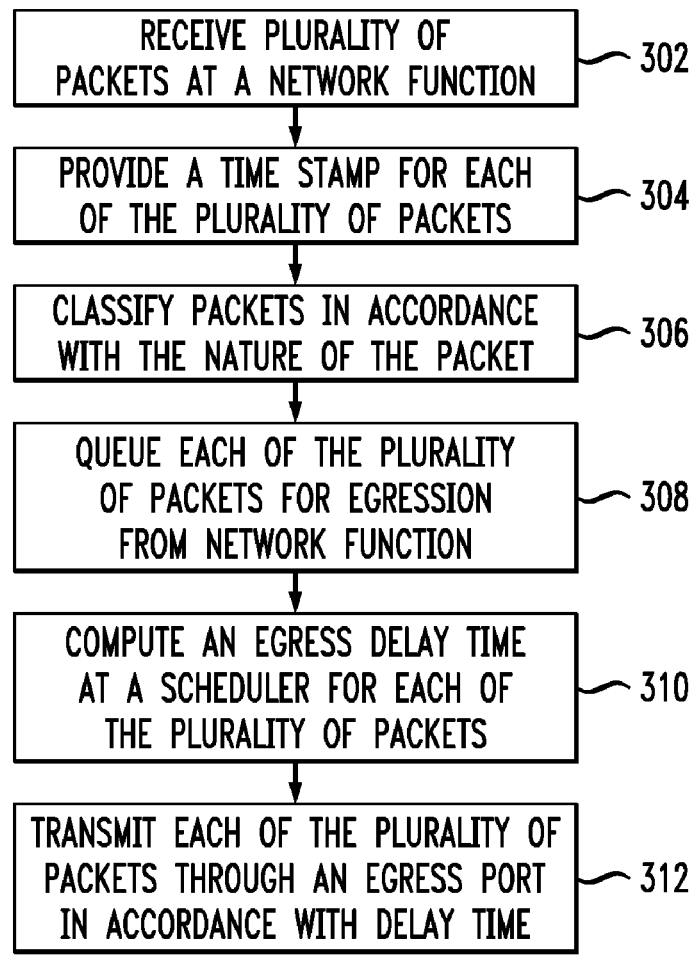
FIG. 3 is a flow diagram illustrating a latency variation control methodology for packets received in a packet transfer network, according to an embodiment of the present invention.

Referring now to FIG. 3, a flow diagram illustrates a latency variation control methodology for packets received in a packet transfer network, according to an embodiment of the present invention. The methodology begins in block 302 where a plurality of packets are received at a network element of a receive node of the packet transfer network. In block 304, a time-stamp is provided for each of the plurality of packets at a classifier of the network element. The time-stamp is provided in accordance with a real-time clock within the network element. In block 306, packets are classified in accordance with the nature of the packet to determine its service eligibility. In block 308, each of the plurality of packets is queued for egression from the network element. The queuing of the plurality of packets may be in accordance with the classification of each packet.

In block 310, an egress delay time is computed at a scheduler of the network element for each of the plurality of packets. Each egress delay time is computed in accordance with a corresponding time-stamp to provide a substantially constant latency for the plurality of packets upon egression from the network element. In block 312, each of the plurality of packets is transmitted through an egress port in accordance with each corresponding egress delay time computed at the scheduler to provide a substantially constant latency for each of the plurality of packets, terminating the methodology.

Figure 4:
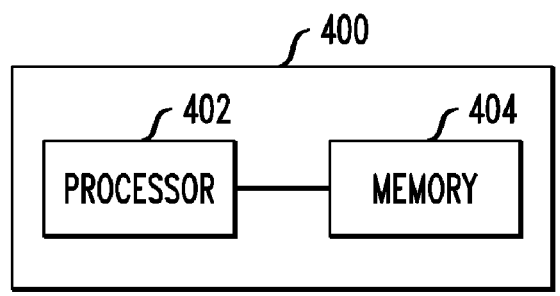
FIG. 4 is a block diagram illustrating an example of an instrument in which a latency variation control technique of the present invention may be implemented.

Referring now to FIG. 4, a block diagram illustrates an example of a computer-processing device in which a latency variation control technique of the invention may be implemented. As illustrated, processing device 400 comprises a processor 402 and a memory 404, and may be used to implement at least a portion of network element 202. One or more of the blocks shown in FIG. 3 may be performed at least in part utilizing software executed by processor 402 and stored in memory 404. Further, processor 402 may be implemented as a part of network element 202, classifier 206 or scheduler 214 of FIG. 2.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices. The term "memory" as used herein is intended to include memory associated with a processor or CPU, such as, for example, RAM, ROM, a fixed memory device (e.g., hard drive), a removable memory device (e.g., diskette), flash memory, etc.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

The present invention may be utilized in conjunction with IEEE 1588 applications, in allowing for the transfer of timing synchronization packets over a packet transfer network with a predictable latency, and thus without PDV.

The present invention may be implemented in the form of one or more integrated circuits or computer programs. For example, a given network node in accordance with the invention may be implemented as one or more integrated circuits comprising at least one processor and at least one memory. Further, a given system network element in accordance with the invention may also be implemented as one or more integrated circuits. Numerous other configurations are possible.

In such an integrated circuit implementation, a plurality of identical die is typically formed in a repeated pattern on a surface of a semiconductor wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Although illustrative embodiments of the present invention have been described herein with reference to the accompanying drawings, it is to be understood that the invention is not limited to those precise embodiments, and that various changes and modifications may be made therein by one skilled in the art without departing from the scope of the invention. For example, as indicated above, it is possible for the illustrative embodiments of the present invention to be implemented as a software program or any other logical method to process information.

What is claimed is:

1. A method for controlling latency variation of packets received in a packet transfer network comprising the steps of:
   receiving a plurality of packets at a network element of a receive node of the packet transfer network;
   providing a time-stamp for each of the plurality of packets; and
   computing an egress delay time at a scheduler of the network element for each of the plurality of packets in accordance with each corresponding time-stamp to provide a substantially constant latency for the plurality of packets upon egression from the network element;
   wherein the egress delay time is computed as a function of the substantially constant latency and a difference between the corresponding time-stamp and a second time-stamp; and
   wherein the substantially constant latency comprises a constant regular interval.

2. The method of claim 1, further comprising the step of queuing each of the plurality of packets for egression from the network element.

3. The method of claim 1, further comprising the step of classifying each of the plurality of packets received at the network element in accordance with a nature of each of the plurality of packets.

4. The method of claim 1, wherein, in the step of providing a time-stamp, the time-stamp is provided in accordance with a real-time clock of the network element.

5. The method of claim 1, further comprising the step of transmitting each of the plurality of packets through an egress port in accordance with each corresponding egress delay time computed at the scheduler.

6. The method of claim 1, wherein, in the step of receiving a plurality of packets, the plurality of packets are received at an ingress port of the network element.

7. The method of claim 1, wherein the network element comprises at least one of a router, a switch, and a multiplexer.

8. The method of claim 1, wherein, in the step of computing an egress delay time, the egress delay time is computed in accordance with the equation $dT = I - (TS_0 - TS_i) - T_0$, where $dT$ is the egress delay time, $I$ is the constant regular interval, $TS_0$ is the second time-stamp, $TS_i$ is the corresponding time-stamp, and $T_0$ is a maximum intrinsic delay.

9. A computer-readable storage medium having executable code embodied therein for controlling latency variation of packets received in a packet transfer network, said executable code comprising one or more programs which when executed implement the steps of claim 1.

10. Apparatus for controlling latency variation of packets received in a packet transfer network, comprising:
    a memory; and
    at least one processor coupled to the memory and operative to: (i) receive a plurality of packets at a network element of a receive node of the packet transfer network; (ii) provide a time-stamp for each of the plurality of packets; and (iii) compute an egress delay time at a scheduler of the network element for each of the plurality of packets in accordance with each corresponding time-stamp to provide a substantially constant latency for the plurality of packets upon egression from the network element;
    wherein the egress delay time is computed as a function of a plurality of the substantially constant latency and a difference between the corresponding time-stamp and a second time-stamp; and
    wherein the substantially constant latency comprises a constant regular interval.

11. The apparatus of claim 10, wherein the at least one processor is further operative to queue each of the plurality of packets for egression from the network element.

12. The apparatus of claim 10, wherein the at least one processor is further operative to classify each of the plurality of packets received at the network element in accordance with a nature of each of the plurality of packets.

13. The apparatus of claim 10, wherein the time-stamp is provided in accordance with a real-time clock of the network element.

14. The apparatus of claim 10, wherein the at least one processor is further operative to transmit each of the plurality of packets through an egress port in accordance with each corresponding egress delay time computed at the scheduler.

15. The apparatus of claim 10, wherein the plurality of packets are received at an ingress port of the network element.

16. A network element in a receive node of a packet transfer network comprising:
  a classifier that provides a time-stamp for each of a plurality of packets received by the network element; and
  a scheduler in communication with the classifier that computes an egress delay time for each of the plurality of packets in accordance with each corresponding time-stamp to provide a substantially constant latency for the plurality of packets upon egression from the network element;
  wherein the egress delay time is computed as a function of the substantially constant latency and a difference between the corresponding time-stamp and a second time-stamp; and
  wherein the substantially constant latency comprises a constant regular interval.

17. The network element of claim 16, further comprising a real-time clock in communication with the classifier for providing a time-stamp for each of the plurality of packets.

18. The network element of claim 16, further comprising one or more queues in communication with the classifier and the scheduler that store one or more of the plurality of packets for egression from the network element.

19. The network element of claim 16, further comprising an ingress port that is in communication with the classifier, and that receives each of the plurality of packets.

20. The network element of claim 16, further comprising an egress port that is in communication with the scheduler, and through which each of the plurality of packets are transmitted in accordance with each corresponding egress delay time computed at the scheduler.

21. An integrated circuit device in a receive node for controlling latency variation of packets received in a packet transfer network, wherein the integrated circuit device is configured to: (i) receive a plurality of packets; (ii) provide a time-stamp for each of the plurality of packets; and (iii) compute an egress delay time for each of the plurality of packets in accordance with each corresponding time-stamp to provide a substantially constant latency for the plurality of packets upon egression;
  wherein the egress delay time is computed as a function of a plurality of the substantially constant latency and a difference between the corresponding time-stamp and a second time-stamp; and
  wherein the substantially constant latency comprises a constant regular interval.

22. A packet transfer system comprising:
  a transmit node; and
  a receive node comprising:
    a classifier that provides a time-stamp for each of a plurality of packets received by the network element; and
    a scheduler in communication with the classifier that computes an egress delay time for each of the plurality of packets in accordance with each corresponding time-stamp to provide a substantially constant latency for the plurality of packets upon egression from the network element;
  wherein the egress delay time is computed as a function of the substantially constant latency and a difference between the corresponding time-stamp and a second time-stamp; and
  wherein the substantially constant latency comprises a constant regular interval.

* * * * *

UNITED STATES PATENT AND TRADEMARK OFFICE
CERTIFICATE OF CORRECTION

PATENT NO. : 7,729,387 B2 Page 1 of 1
APPLICATION NO. : 11/669559
DATED : June 1, 2010
INVENTOR(S) : J. Beck et al.

It is certified that error appears in the above-identified patent and that said Letters Patent is hereby corrected as shown below:

Claim 10, col. 6, line 51, please delete "a plurality of".
    Claim 21, col. 8, line 11, please delete "a plurality of".

Signed and Sealed this

Third Day of August, 2010

David J. Kappos
*Director of the United States Patent and Trademark Office*